March 28, 1944.  H. W. SEMAR  2,345,298

GEAR CHECKING APPARATUS

Filed May 11, 1943

WITNESSES:

INVENTOR
HAROLD W. SEMAR.
BY
ATTORNEY

Patented Mar. 28, 1944

2,345,298

UNITED STATES PATENT OFFICE 2,345,298

GEAR CHECKING APPARATUS

Harold W. Semar, Drexel Hill, Pa., assignor to Westinghouse Electric & Manufacturing Company, East Pittsburgh, Pa., a corporation of Pennsylvania Application May 11, 1943, Serial No. 486,575

8 Claims. (Cl. 33—179.5)

This invention relates to gearing, more particularly to gears and pinions of the double-helical type, and has for an object to provide means for checking the accuracy of the included angle between the teeth of the two helices.

Accuracy of the included angle is vital for proper contact between gear and pinion teeth, whereas an error in the angle of one helix may be compensated for by an error of opposite sign in the other helix, hence the importance of an accurate check of the included angle. The error in the included angle between the teeth of the two helices is the algebraic sum of the errors in the right and left-hand angles.

The device consists of two master blocks, each having two reference pins, accurately spaced, that are received in the spaces between the teeth of the gear or pinion being checked. The distance between the pins is an integral multiple of the axial pitch of the teeth, with the result that, if the helix angle is correct, an imaginary line joining the centers of the pins will be parallel to the gear or pinion axis.

Each master block preferably carries a T-head, the heads being at adjacent ends of the blocks during use, and include provision for measuring any departure from parallelism of the heads, such departure being a measure of the error in the included angle of the two helices.

This and other objects are effected by the invention as will be apparent from the following description and claims taken in connection with the accompanying drawing, forming a part of this application, in which:

Figure 1:
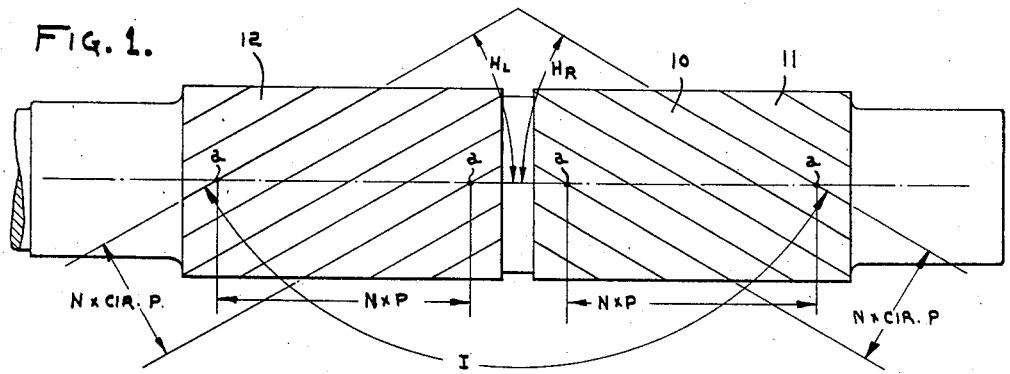
Fig. 1 is an elevational view of a pinion to be checked.

Referring now to the drawing more in detail, there is shown, at 10, a pinion comprising right-hand helix 11 and left-hand helix 12, the angle of the former being shown at $H_R$ and that of the latter at $H_L$ (Fig. 1). The included angle of the right-hand helix 11 and left-hand helix 12 is indicated at I in this figure.

Figure 2:
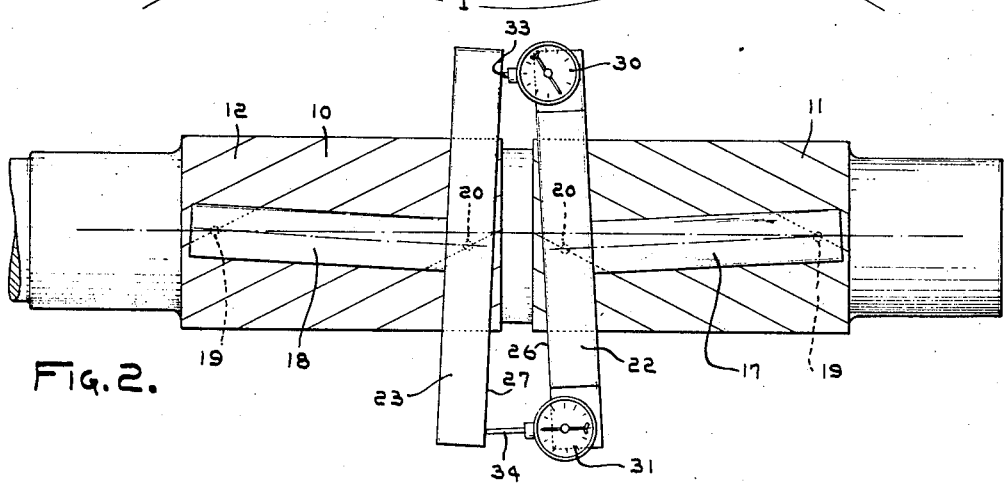
Fig. 2 is a plan view of the pinion shown in Fig. 1, together with the apparatus of the subject invention applied thereto.

In Fig. 2, there is illustrated one form of device for determining the error in the included angle I, this error being the algebraic sum of the errors in the angles $H_R$ and $H_L$.

As illustrated, the apparatus consists of a pair of master gauge blocks 17 and 18, each having a spaced pair of conical pins 19 and 20 projecting from the under surface thereof, the conical points of the pins being adapted to be received in the spaces 14 between the teeth 13 of the pinion. The pins 19 and 20 of each master gauge block are accurately spaced a distance indicated at $N \times P$ in Fig. 1, which distance is an integral multiple of the axial pitch of the teeth. In the construction herein illustrated, the distance is the sum of four such pitches.

With the centers of the pins so spaced, and assuming the teeth to be formed with the correct axial pitch, an imaginary line connecting the centers of the pins 19 and 20 will be parallel to the axis of the gear if there is no error in the angle of either the right-hand helix or the left-hand helix. Thus, it will be apparent that any departure from longitudinal alignment of such imaginary lines connecting the centers of the pins 19 and 20, is a measure of the error in the included angle of the helices.

In order to easily and accurately measure any such departure from longitudinal alignment of the pins, the master blocks 17 and 18 are provided with T-heads 22 and 23, respectively, extending at right angles to the line of the pins. If such T-heads 22 and 23 are provided with flat adjacent faces 26 and 27, formed exactly at right angles to the imaginary line connecting the centers of the pins, any departure from parallelism of said faces 26 and 27 will likewise be a measure of the error in the included angle I of the helices.

While any suitable means may be used for measuring the departure from parallelism of the two T-heads 22 and 23, for example, the use of internal calipers or micrometers between the adjacent surfaces 26 and 27, there is illustrated in the drawing a more readily readable measuring device in the form of a pair of dial indicators 30 and 31, mounted on the T-head 22 in such position that their plungers 33 and 34, respectively, are adapted to engage the flat surface 27 of the T-head 23.

Figure 3:
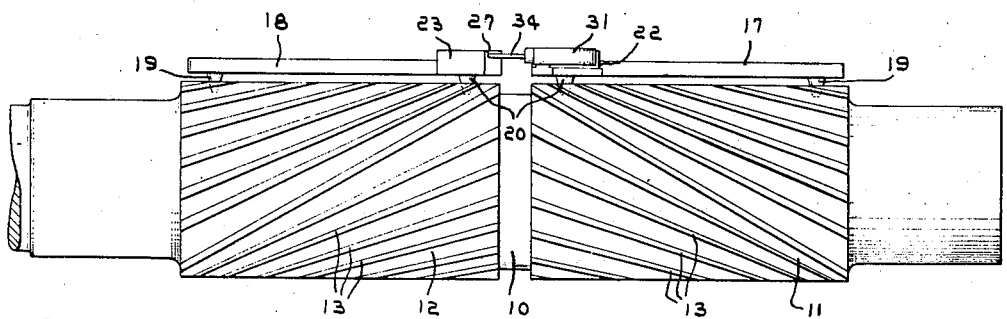
Fig. 3 is a front elevational view of the apparatus shown in Fig. 2.
Figure 4:
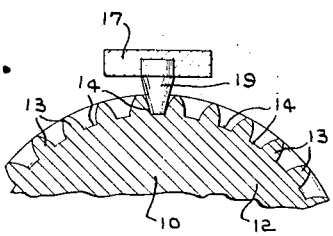
Fig. 4 is an enlarged fragmentary sectional view of a portion of the structure shown in Fig. 3.

By first placing the two master gauge blocks on a master aligning block having a single straight groove of a size and depth equal to the spaces 14 between the teeth 13 of the pinion or gear to be checked, the indicators 30 and 31 may be adjusted for zero reading of both instruments when the four pins 19 and 20 are accurately aligned by the single straight groove. With the indicators thus set for zero readings with true parallelism of the two T-heads 22 and 23, the master gauge blocks 17 and 18 are placed on the pinion or gear to be checked, as in Figs. 2 and 3, and are caused to approach each other until one of the indicators reads zero. The reading of the other indicator will then indicate accurately the departure from parallelism of the T-heads.

Preferably, the dial indicators 30 and 31 are so spaced apart that the distance between plungers 33 and 34 is equal to the distance between the pins 19 and 20, with the result that the reading indicated by the indicators is a direct measure of the error in the included angle I of the helices.

Instead of adjusting the indicators 30 and 31 by use of a master aligning block, the gauge blocks may be placed on the gear or pinion to be checked and the indicators set for zero reading. Upon reversing the positions occupied by the blocks, the difference in the indicator readings will be double the error in the included angle.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. Apparatus for measuring errors in the included angle of the teeth of double-helical gears and pinions; said apparatus comprising a pair of gauge blocks; a pair of reference pins carried by each block and adapted to be received in the spaces between the teeth of gears and pinions to be checked, the pins of each block being spaced apart an integral multiple of the axial pitch of the teeth; and each of said blocks having a flat end lying in a plane normal to the plane containing the longitudinal axes of the reference pins, whereby, when said pair of gauge blocks are positioned one on each half of a double-helical gear or pinion to be checked, with the reference pins received in the spaces between the teeth and the flat ends of the blocks disposed in opposed relation, any departure from parallelism of said flat ends is a measure of the error in the included angle of the two helices.

2. Structure as specified in claim 1, wherein the length of the flat end of each gauge block is as great as the spacing of the reference pins.

3. Structure as specified in claim 1, including means for measuring the departure from parallelism of the flat ends.

4. Structure as specified in claim 1, including means for measuring the departure from parallelism of the flat ends over a distance corresponding to the spacing of the reference pins, whereby any measured departure from parallelism is a direct measure of the error in the included angle of the teeth of the double-helical gear or pinion being checked.

5. Apparatus for measuring errors in the included angle of the teeth of double-helical gears and pinions; said apparatus comprising a pair of gauge block bodies; a pair of reference pins projecting from each block body with their longitudinal axes parallel and spaced apart a multiple of the axial pitch of the teeth of the gear or pinion to be checked; and a gauge block head carried by each gauge block body and extending transversely of a plane containing the longitudinal axes of the reference pins, whereby, when said pair of gauge block bodies are positioned one on each half of a double-helical gear or pinion to be checked, with the reference pins received in the spaces between the gear or pinion teeth and the gauge block heads adjacent, any departure from parallelism of said heads constitutes a measure of error in the included angle of the helices.

6. Structure as specified in claim 5, including means for measuring any departure from parallelism of the gauge block heads.

7. Structure as specified in claim 5, including means associated with each gauge block head providing a pair of surfaces so disposed that a line joining them extends at right angles to the plane containing the longitudinal axes of the reference pins.

8. Apparatus for measuring error in the included angle of the teeth of a double-helical gear or pinion; said apparatus comprising a pair of gauge blocks; a pair of reference pins carried by each block, the pins of one block being adapted to be received in the spaces between the teeth of one helix of the gear or pinion to be checked and the pins of the other block being adapted to be received in the spaces between the teeth of the other helix of the gear or pinion to be checked, the pins of each block having parallel longitudinal axes spaced apart an integral multiple of the axial pitch of the teeth, whereby when the gauge blocks are positioned with their pins received in the spaces between the teeth, any departure from longitudinal alignment of said pairs of pins is a measure of the error in the included angle of the two helices; and means for measuring such departure from longitudinal alignment.

HAROLD W. SEMAR.